US005450294A

United States Patent [19]

Hogrefe

[11] Patent Number: 5,450,294

[45] Date of Patent: Sep. 12, 1995

[54] HEADLIGHT FOR VEHICLES

[75] Inventor: Henning Hogrefe, Reutlingen, Germany

[73] Assignee: Robert Bosch GmbM, Stuttgart, Germany

[21] Appl. No.: 97,068

[22] Filed: Jul. 23, 1993

[30] Foreign Application Priority Data

Aug. 29, 1992 [DE] Germany ........................ 42 28 890.8

[51] Int. Cl.$^6$ ................................................ B60Q 1/04

[52] U.S. Cl. ........................................ 362/61; 362/297; 362/346; 362/351

[58] Field of Search .................... 362/61, 80, 297, 298, 362/310, 346, 347, 351

[56] References Cited

U.S. PATENT DOCUMENTS 4,517,630 5/1985 Dieffenbach et al. ................ 362/80
4,800,467 1/1989 Lindae et al. ........................ 362/297
4,945,455 7/1990 Akizuki .............................. 362/298

FOREIGN PATENT DOCUMENTS 3319562 2/1984 Germany ............................ 362/347
3406876 7/1985 Germany ............................ 362/346
33334459 11/1985 Germany .
189802 7/1990 Japan .................................. 362/299
156801 7/1991 Japan .................................. 362/297

*Primary Examiner*—Ira S. Lazarus
*Assistant Examiner*—Y. Quach
*Attorney, Agent, or Firm*—Michael J. Striker

[57] ABSTRACT

A headlight for vehicles has a reflector provided with a light source and having in axial longitudinal sections substantially ellipsoidal section curves, a screen spaced from a reflector apex in the light direction, and a lens spaced from the screen in the light direction. The section curves have first focal points arranged in the region of the light source. The reflector has section curves produced in a vertical longitudinal section and having second focal points arranged in the region of the screen, and also section curves produced in a horizontal longitudinal section and having second focal points arranged in the region of the lens. The reflector is subdivided into at least two parts which border one another in a contact plane, and at least one of the reflector parts is displaced in a direction perpendicular to the contact plane so that an apex of the section curve produced in the axial longitudinal section and extending perpendicular to the contact plane is displaced relative to the contact plane.

11 Claims, 3 Drawing Sheets

HEADLIGHT FOR VEHICLES

BACKGROUND OF THE INVENTION

The present invention relates to a headlight for vehicles. More particularly, it relates to a headlight having a reflector and a light source, wherein the reflector in axial longitudinal sections has substantially ellipsoidal section curves.

Such a headlight is disclosed for example in the German document DE 33 34 459 A1. The headlight has a reflector which in its axial longitudinal sections has section curves formed as ellipses. The first focal points of the ellipses substantially coincide, and the incandescent coil of an incandescent lamp is arranged in this region. A screen [aperture] is spaced from the reflector apex in a light direction, and a lens is spaced from the screen in the light direction. The second focal point of the ellipse produced in the vertical longitudinal section by the reflector is located in the region of the screen. The second focal point of the ellipse produced in the horizontal longitudinal section by the reflector is located in the region of the lens. The upper edge of the screen is projected through the lens as a bright-dark limit in the light intensity distribution produced by the headlight.

In new headlights, gas discharge lamps are utilized as light sources instead of the incandescent lamps. They provide a substantially higher intensity light stream and have a longer service life. With the utilization of a light source which has a higher light intensity when compared with an incandescent lamp, such as a gas discharge lamp, the headlight known from the German reference DE 33 34 459 A1 causes, due to the radiation characteristic different from that of an incandescent lamp, undesired non-uniformities in the light intensity distribution produced by the headlight. Moreover, the radiation range maximum is located not in the center of the light intensity distribution, but instead is offset laterally to it and is so high that the maximum light intensity values which are prescribed in accordance with corresponding regulations are exceeded. Generally speaking, this headlight is therefore not suitable for the use of a light-intense light source.

SUMMARY OF THE INVENTION

Accordingly, it is an object of the present invention to provide a headlight of the above-mentioned type, which avoids the disadvantages of the prior art.

In keeping with these objects and with others which will become apparent hereinafter, one feature of the present invention resides, briefly stated, in a headlight of the above-mentioned type, in which the reflector is subdivided into at least two parts which border one another in a contact plane, and at least one reflector part is displaced in a direction perpendicular to the contact plane, so that the apex of the section curve located in the longitudinal section perpendicular to the contact plane is displaced relative to the contact plane.

When the headlight is designed in accordance with the present invention, it has the advantage that due to the reflector part which is displaced a little relative to the contact plane, the position of the light intensity maximum is changed, and it can be arranged in the center of the light intensity distribution by a corresponding displacement of at least one reflector part.

In accordance with another feature of the present invention, the contact plane is arranged vertically, and at least one reflector part is displaced horizontally relative to the contact plane. Due to the horizontal displacement of at least one reflector part, horizontal faulty positions of the light intensity distribution can be corrected.

In accordance with still another feature of the present invention, the first and second focal points of the section curves which are produced in the horizontal longitudinal section by the reflector part located at the side facing away from the traffic from the opposite direction, are located at a greater distance from the reflector apex than the first and second focal points of the section curve produced in the horizontal longitudinal section by the reflector part located at the side of the traffic from the opposite direction. When the reflector is formed in accordance with these features, a great horizontal dissipation of light is provided, so that a good illumination of the roadway edges is obtained.

A further feature of the present invention is that the contact plane is arranged horizontally, and at least one reflector part is displaced vertically relative to the contact plane. The vertical displacement of at least one reflector part can correct vertical faulty positions of the light intensity distribution.

In accordance with still a further feature of the present invention, the second focal point of the section curve which is produced in the vertical longitudinal section by the reflector part located under the contact plane is arranged at a lower distance from the reflector apex than the second focal point of the section curve produced in the vertical longitudinal section by the reflector part located above the contact plane. With this construction, a part of light which is reflected from the lower reflector part is supplied onto the screen and contributes to the light intensity distribution.

Finally, the transition of the reflector part in the region of the reflector apex can be continuous in first and second orders. When the transition of the reflector part in the first and second order is continuous, the manufacture of the reflector is simplified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
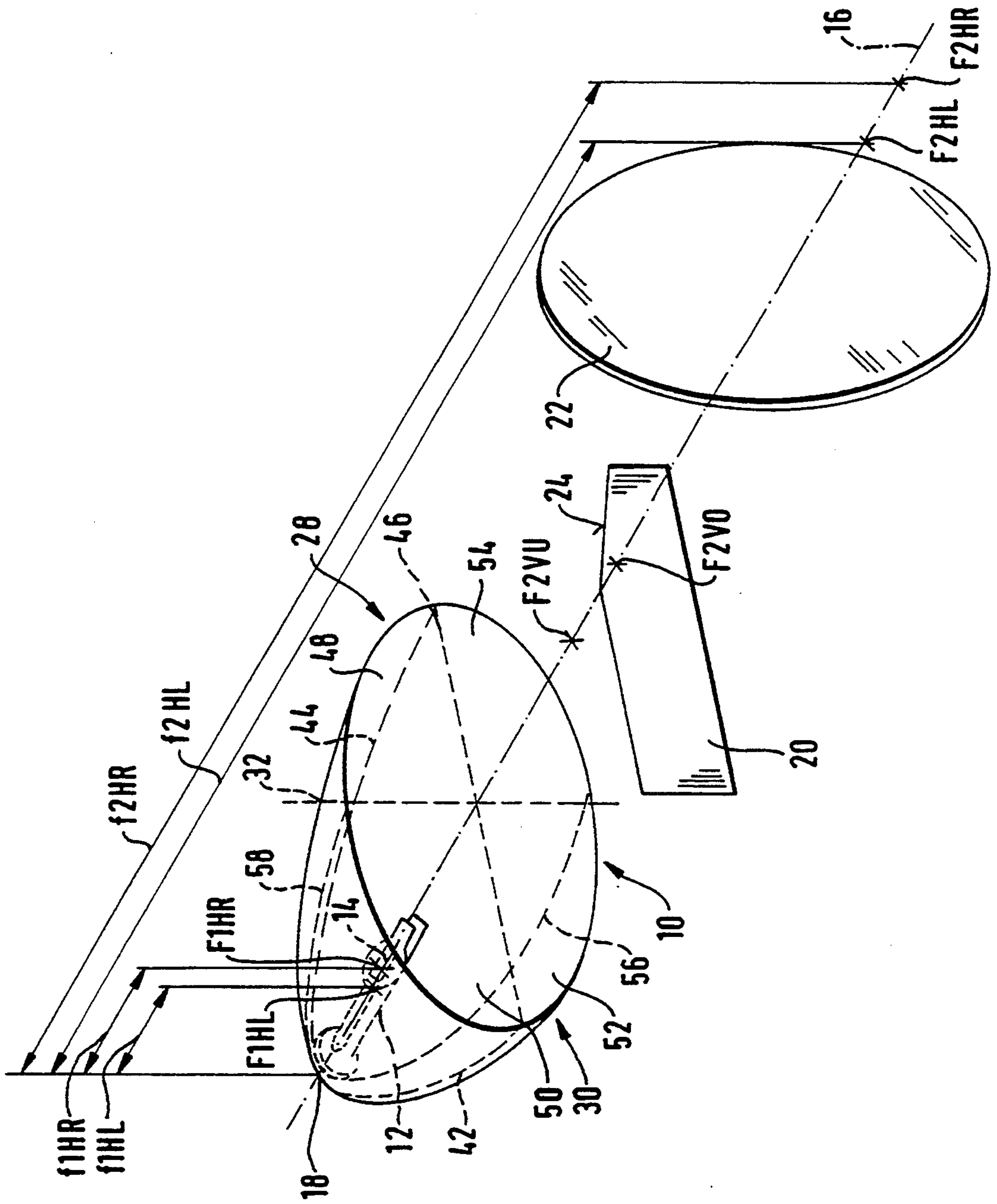
FIG. 1 is a simplified perspective view of a headlight in accordance with the first embodiment of the present invention.
Figure 2:
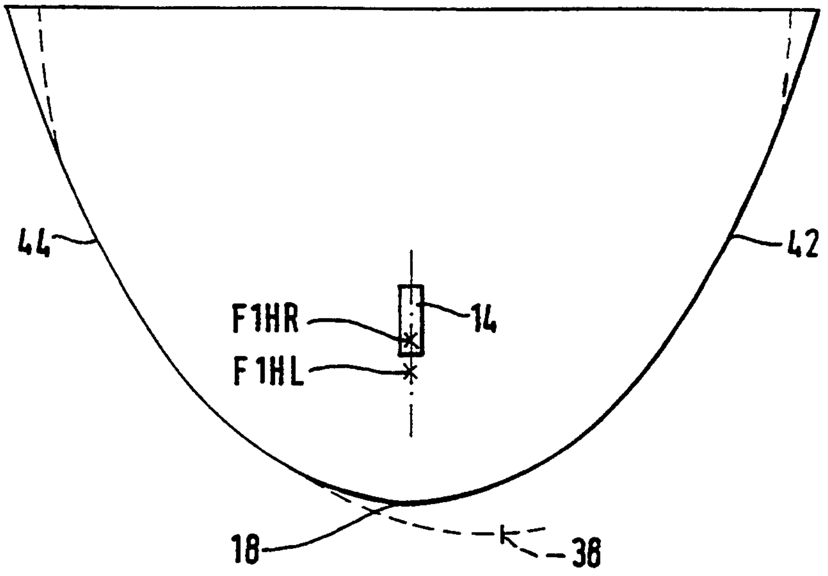
FIG. 2 is a view showing a horizontal central section of the reflector of the headlight of FIG. 1.
Figure 4:
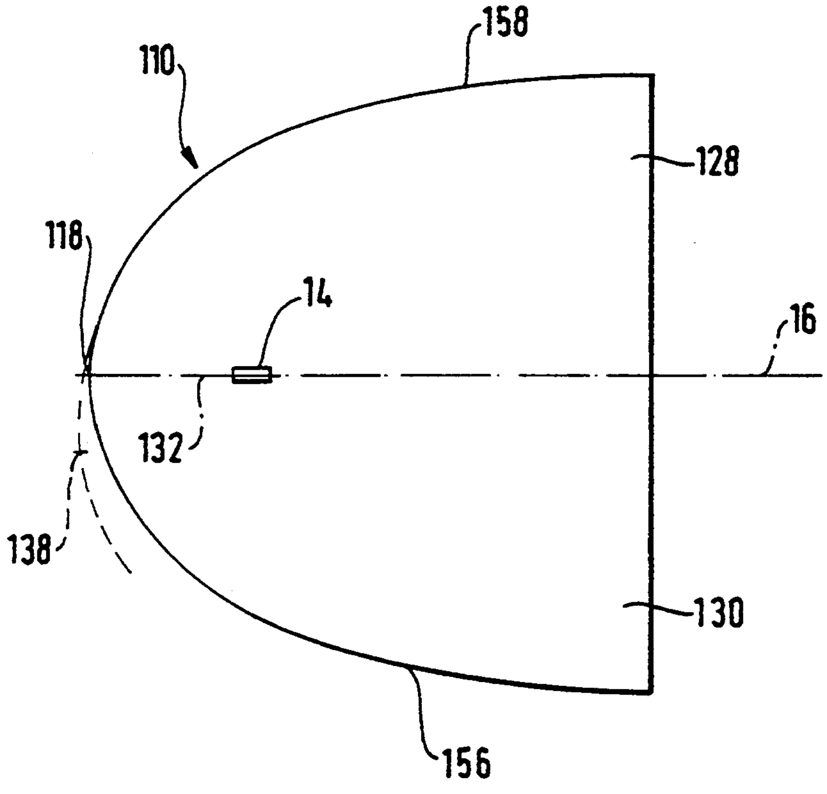
FIG. 4 is a view showing a vertical central section of the reflector of the headlight of the second embodiment.

A headlight for vehicles shown in FIGS. 1, 2 and 4 is formed as an anti-dazzle or dim headlight. It has a reflector 10 provided with a light source formed by a gas discharge lamp 12. A light arc 14 of the gas discharge lamp extends during the operation substantially along an optical axis 16 of the reflector 10. A light-impermeable screen [aperture] 20 extends under the optical axis 16 and is spaced from a reflector apex 18 in the light direction, or in other words in the direction of the light rays reflected by the reflector 10. A lens 22 is spaced from the screen 20 in the light direction. A cover, formed for example as a not-shown light disc, is spaced in the light direction from the lens 22. The upper edge 24 of the screen 20 is projected through the lens 22 as a light-dark limit 26 in the light intensity distribution produced by the reflector. The reflector 10 in axial longitudinal sections or in other words in the longitudinal sections which contain the optical axis 16, have substantially ellipsoidal section curves with corresponding two focal points F1 and F2. The section curves have, in correspondence with their focal points F1 and F2, a first focal length f1 defined as a distance between the reflector apex 18 and a corresponding first focal point F1, and a second focal length f2 defined as a distance between the reflector apex 18 and a corresponding second focal point F2.

Figure 3:
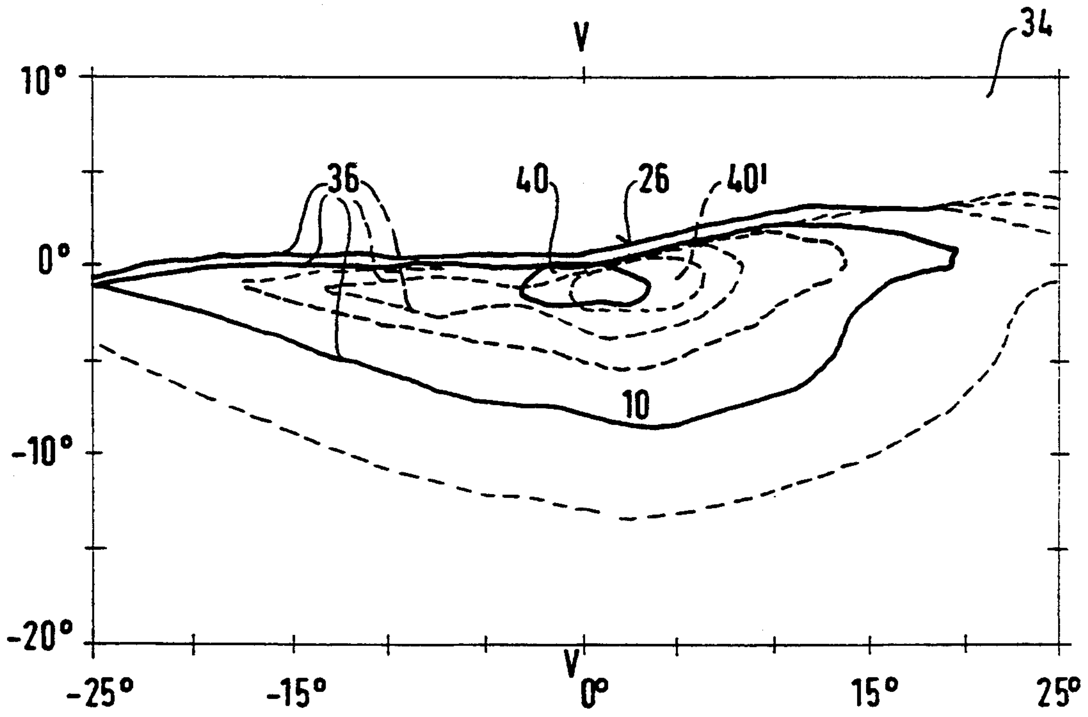
FIG. 3 is a view showing the light intensity distribution produced on a measuring screen by the headlight in accordance with the present invention.

In the first embodiment shown in FIG. 1, the reflector 10 is subdivided into a left part 28 and a right part 30 as considered in the light direction. They abut against one another near a vertical contact plane 32 which contains the optical axis 16. The headlight shown in FIG. 1 is designed for right side traffic, so that subsequent provisions are made for the right side traffic. For left side traffic they correspondingly must be reversed. FIG. 3 shows a measuring screen 34 which is arranged at a certain distance from the headlight at a right angle to the optical axis 16. The reflector produces on the measuring screen 34 a light intensity distribution with several isolux lines 36 which are lines with the same light intensity. The left reflector part 28 reflects light substantially in the region of the light intensity distribution located at the right side of a vertical central plane V—V, while the right reflector part 30 reflects correspondingly in the region located at the left side of the plane V—V.

The left reflector part 28 is displaced horizontally to the right reflector part 30, so that the apex 38 of a section curve 44 contained in a horizontal longitudinal section, as identified by the broken line in FIG. 2, is located at the side of the right reflector part 30. The portion of the left reflector part 28 which overlaps the right reflector part 30 is, however, not available since the left reflector part 28 extends only to the vicinity of the contact plane 32. The displacement of the left reflector part 28 amounts to several tenths of millimeters, for example, 0.7 mm. Due to the displacement of the left reflector part 28, discontinuity, for example, a step or a bend is produced in the region of the contact plane 32. The transition between both reflector parts 28 and 30 is, however, rounded so that it is continuous in the first and second order, or in other words neither a step nor a bend is available.

In the not-displaced left reflector part 28, the light intensity maximum is located at a point identified with reference numeral 40′ and shown in the broken line in FIG. 3 and therefore at the right side of the plane V—V which, however, is not desirable. Due to the inventive displacement of the left reflector part 28 to the right, the light intensity maximum is displaced in the region of the plane V—V to the left to a point identified with reference numeral 40, where a better remote radiation field illumination of the roadway is provided.

The left reflector part 28 can be displaced to the left relative to the contact plane 32, and then the light intensity maximum 40 is further displaced to the right. The section curves of the left reflector part 28 extend then outwardly beyond their apex 38, so that the reflector apex 18 has a depression. In this case the section curves in the apex region 18 of the reflector 10 are replaced with other curves, so that their continuous transition in the first and second order of both reflector parts 28 and 30 is produced. Correspondingly to the left reflector part 28, also the right reflector part 30 can be displaced relative to the contact plane 32. The displaced arrangement of the left and/or right reflector part 28,30 corresponds generally to the corrections which must be made with regard to the light intensity distribution.

Preferably the section curve 42 produced in the horizontal axial longitudinal section by the right reflector part 30 has a longer first and second focal length f1 hr and f2 hr than the section curve 44 produced in the horizontal axial longitudinal section through the left reflector part 28 whose focal lengths are identified with f1 hl and f2 hl. The first focal point F1 HR of the section curve 42 of the right reflector part 30 is located further from the reflector apex 18 than the first focal point F1 HL of the section curve 44 of the left reflector part 28. For example, the first focal point F1 HL of the left section curve 44 can be located in the region of the end of the light arc 14 of the gas discharge lamp 12 facing the reflector apex 18, while the first focal point F1 HR of the right section curve 42 can be spaced substantially further than F1 HL from the reflector apex 18 toward the central region of the light arc 14. The second focal point F2 HR of the right section curve 42 is spaced in the light direction from the lens 22 further than the second focal point F2 HL of the left section curve 44, which is also spaced in the light direction from the lens 22. Due to this construction of the reflector 10, a portion of the greater light stream of the gas discharge lamp 12 reflected by the right reflector part 30 is no longer as intense as in the prior art for the light intensity maximum 40 of the light intensity distribution. Instead, the light is more efficiently dissipated to the left, so that a more intense light illumination is obtained. This is shown in FIG. 3 on the measuring screen 34. The right reflector part 30 is advantageously designed so that the light intensity maximum of 50 lux is not exceeded.

In accordance with a further embodiment of the reflector 10, its left part 28 and its right part 30 are further subdivided into an upper part and a lower part which merge into one another in a stepless fashion in a horizontal central plane 46. Thus, the reflector is subdivided, as considered in a light direction, into an upper left quadrant 48, and upper right quadrant 50, a lower right quadrant 52 and a lower left quadrant 54. In the horizontal longitudinal section the left quadrants 48 and 54 are formed as described above with regard to their focal point location. In the vertical longitudinal section the upper quadrants 48,50 are formed differently from the lower quadrants 52,54. A section curve 56 produced in the vertical axial longitudinal section through both lower quadrants 52,54 has a shorter second focal length than a section curve 58 produced in the vertical axial longitudinal section through both upper quadrants 48,50.

The second focal point F2 VU of the lower section curve 56 can be located in the light direction before the screen 20 and the second focal point F2 VO of the upper section curve 58 can be located near the screen 20 in the light direction. The first focal lengths of the section curves produced in the vertical axial longitudinal section of the upper and lower quadrants can be identical. The first focal lengths of the upper section curve 58 can, however, alternatively be different than the first focal lengths of the lower section curve 56 which can be shorter. Due to the subdivision of the reflector 10 into the four quadrants, a portion of light reflected by the lower quadrants 52,54 which normally is blocked by the screen 20, is captured now by the lens 22 and used for producing the light intensity distribution.

With the subdivision of the reflector 10 into the quadrants 48,50,52,54 it is possible to displace correspondingly only the upper or the lower quadrant to one side. Moreover, the quadrants of correspondingly one side can be displaced by different distances. That is why a desired change of the characteristic of the light intensity distribution is possible.

The section curves which are produced in the axial longitudinal sections by the reflector 10 can, as shown in the broken line in FIG. 2, deviate from the elliptic shape in the outer edge region or in other words in the region facing the front edge of the reflector 10. They can extend in accordance with a different curvature. That is why the light intensity distribution produced by the headlight can be finely optimized.

FIG. 4 shows a second embodiment of the headlight, in which the reflector 110 is subdivided into an upper part 128 and a lower part 130 abutting against one another in a contact plane 132 which contains the optical axis 16. For compensating a vertical faulty position of partial regions of the light intensity distribution, the upper reflector part 128 is vertically displaced relative to the contact plane 132. The direction of the displacement of the reflector part 128 depends on the direction in which the partial regions of the light intensity distribution must be displaced. When a displacement of the light intensity maximum is performed vertically upwardly, the upper reflector part 128 must be displaced downwardly as shown in FIG. 4. Vice versa, the lower reflector part 130 for a displacement of the light intensity maximum 40 downwardly must be displaced upwardly. Correspondingly, also the upper reflector part 128 can be displaced relative to the contact plane 132. However, it should be noted that it must be displaced upwardly for obtaining a displacement of the partial region of the light intensity distribution downwardly, or must be displaced downwardly for obtaining a displacement of the partial region of the light intensity distribution upwardly.

With an arrangement of the upper reflector part 128 displaced upwardly or the lower reflector part 130 displaced downwardly, the apex 138 of the section curves 156 and 158 produced in the vertical longitudinal section are located at the side of the corresponding other reflector part. The reflector parts 128,130 extend, however, only to the contact plane 132, so that the apexes 138 of the section curves 156 and 158 are so-called called cut off as shown in the embodiment of the reflector 10 in FIG. 2. In an arrangement of the upper reflector part 128 displaced upwardly or the lower reflector part 130 displaced downwardly, their section curves 156 and 158 extend outwardly over the apexes 138 and therefore a depression is produced in the apex region 118 of the reflector 110. The transition of the reflector parts 128 and 130 in the region of the contact plane 132 is, however, continuous in the first and second order as in the first embodiment. For this purpose the apex region 118 of the reflector 110 is rounded, so that there is no step, or bend, or depression there.

The construction of the reflector 10 in accordance with the first embodiment makes possible a vertically displaced arrangement of the upper quadrants 48,50 and/or the lower quadrants 52,54. Therefore, both upper quadrants 48,50 and/or both lower quadrants 52,54 can be displaced by the same distances or different distances. It is also possible to displace only one upper and/or only one lower quadrant, while the other is not displaced.

Finally, the reflector can be subdivided into several reflector parts which are arranged with displacements correspondingly horizontally or correspondingly vertically, or correspondingly vertically and horizontally.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A headlight for vehicles, comprising a reflector having a reflector apex; said reflector in axial longitudinal sections having substantially ellipsoidal section curves; a light source; a screen spaced from said reflector apex in a forward light direction; a lens spaced from said screen in the light direction, said section curves having first focal points arranged in the region of said light source, said section curves of said reflector including a section curve produced in a vertical longitudinal section and having a second focal point arranged in the region of said screen, said section curve of said reflector also including a section curve produced in a horizontal longitudinal section and having a second focal point arranged in the region of said lens, said reflector being subdivided into at least two parts which border one another in a contact plane, at least one of said reflector parts being displaced in a direction perpendicular to said contact plane so that an apex of a section curve, produced in an axial longitudinal section of said at least one reflector part and extending in a direction to said contact plane and oriented perpendicular to said contact plane, is displaced relative to and offset from said contact plane.

2. A headlight as defined in claim 1, wherein said contact plane is arranged substantially vertically, at least one of said reflector parts being displaced horizontally relative to said contact plane.

3. A headlight as defined in claim 2, wherein light is displaced in a reflector part which reflects on a directional roadway so that, said apex of said section curve produced in the longitudinal section of said at least one reflector part, which side is opposite to said one displaced reflector part.

4. A headlight as defined in claim 2, wherein a first focal point and the second focal point of the section curve produced in the horizontal longtitudinal section through said one of said reflector parts is arranged at a shorter distance from said reflector apex than the first and second focal points of the section curve produced in the horizontal longitudinal section through another of said reflector parts.

5. A headlight as defined in claim 1, wherein said contact plane is arranged horizontally, at least one of said reflector parts being displaced vertically relative to said contact plane.

6. A headlight as defined in claim 5, wherein said second focal point of the section curve produced in the vertical longitudinal section through said one of the reflector parts located under the said contact plane is arranged at a smaller distance from said reflector apex than the second focal point of the section curve produced in the vertical longitudinal section through another of said reflector parts located above said contact plane.

7. A headlight as defined in claim 6, wherein said second focal point of the section curve produced in the vertical longitudinal section through said reflector part located under said contact plane is located in the light direction before said screen, said second focal point of the section curve produced in a vertical longitudinal section through said reflector part located above said contact plane being located in the light direction after said screen.

8. A headlight as defined in claim 1, wherein said contact plane is arranged vertically, said reflector further having a further contact plane which is arranged horizontally so as to subdivide said reflector into four quadrants produced by said contact planes, at least a part of said quadrants being displaced relative to said contact planes.

9. A headlight as defined in claim 1, wherein said section curves produced in the axial longitudinal section through said reflector deviate from the ellipsoidal form in an edge region of said reflector.

10. A headlight as defined in claim 1, wherein a transition of said reflector parts in the region of said reflector apex is continuous in first and second orders.

11. A headlight as defined in claim 1, wherein said light source is a gas discharge lamp.

* * * * *